United States Patent [19]

Kennedy et al.

[11] Patent Number: 5,066,730

[45] Date of Patent: Nov. 19, 1991

[54] LIVING POLYMERIZATION OF OLEFINS TO END-FUNCTIONALIZED POLYMERS

[75] Inventors: Joseph P. Kennedy; Munmaya K. Mishra, both of Akron, Ohio

[73] Assignee: The University of Akron, Akron, Ohio

[21] Appl. No.: 500,771

[22] Filed: Mar. 28, 1990

Related U.S. Application Data

[62] Division of Ser. No. 173,049, Mar. 28, 1988, Pat. No. 4,929,683.

[51] Int. Cl.[5] .................. C08F 255/00; C08F 293/00; C08F 4/06; C08F 2/00; C08F 10/10
[52] U.S. Cl. .................................. 525/319; 525/267; 525/268; 526/131; 526/209; 526/348.6; 526/348.7
[58] Field of Search .......................................... 525/319

[56] References Cited

FOREIGN PATENT DOCUMENTS

2097509 4/1990 Japan.
0589393 6/1947 United Kingdom ................ 526/209

*Primary Examiner*—Joseph L. Schofer
*Assistant Examiner*—Wu C. Cheng
*Attorney, Agent, or Firm*—Oldham & Oldham Co.

[57] ABSTRACT

This invention provides a novel catalyst composed of a complex of an organic ether and a Lewis acid, preferably boron trichloride that can add olefin monomers to increase the molecular weight of the complex from as low as 200 to in excess of 100,000 preferably 500 or 1000 to 10,000 and higher, with the complex being active viz., living, until the complex dies, viz., is decomposed or destroyed so that polymers in the liquid or easily liquefiable range of 300 to about 10,000 and preferably 500 or 1000 to 10,000 and higher can be made or those more difficult to be liquefied or unliquefiable, viz., those of over 10,000 up to 100,000 and having useful end groups such as the halogens and specifically chloride.

14 Claims, No Drawings

LIVING POLYMERIZATION OF OLEFINS TO END-FUNCTIONALIZED POLYMERS

This is a divisional of copending application Ser. No. 07/173,049 filed on Mar. 28, 1988 now U.S. Pat. No. 4,929,683.

TECHNICAL FIELD

This invention relates to a novel class of living polymerization systems useful to produce novel polymers having well-defined head groups and end groups. More in particular, this invention concerns complexes that are able to incorporate one or many olefinic monomers and thus grow into polyolefins having low molecular weights in the range of 200 to 500 or medium molecular weights in the range of 2000 to 10,000 or high molecular weights in the range of 100,000 or higher. Specifically, this invention discloses a living polymerization method that gives rise to polymers carrying well-defined useful and versatile head groups and tail groups.

BACKGROUND ART

Truly living polymerization, i.e., truly termination-less and chain transferless polymerizations, are a most desirable objective of the synthetic polymer chemist. If the rates of both termination and chain transfer are zero, $R_t = R_{tr} = 0$, and the rate of initiation is larger than that of propagation $R_i > R_p$, polymer molecule weights are determined by the ratio $[M]/[I]$ (i.e., monomer over initiator concentrations) and $\overline{M}_w/\overline{M}_n$ will be reasonably small. If $R_i$ is instantaneous and/or $R_i >> R_p$, then $\overline{M}_w/\overline{M}_n \simeq 1.0$. Living polymerizations are not only of scientific interest, but also of great commercial consequence, and several industrial processes are based on living systems, e.g., cis-1,4-polybutadiene, triblock copolymers of styrene-butadiene/styrene, polytetrahydrofuran, but these are not carbocationic polymerization processes.

DISCLOSURE OF INVENTION

Recently, we have developed a series of new initiator systems that lead us to true living polymerization systems for olefins such as isobutylene, copolymerization systems of an olefin such as isobutylene with a diolefin such as isoprene, and to new telechelic and reactive polymers of isobutylene or related olefins.

This invention concerns a new family of initiating systems, a new process for making polymers and a series of new products having specific end groups thereon.

The family of initiating systems is based on organic ethers in conjunction with a Lewis acid, preferably BCl₃, as illustrated by the following formulae:

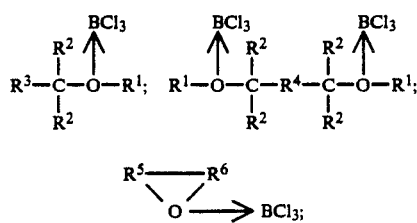

and

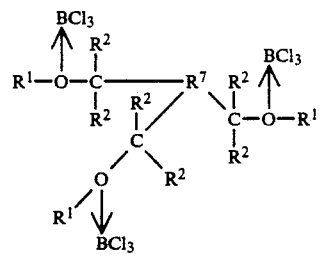

where $R^1$ in the above formula may be an organic moiety such as methyl and related alkyl or aralkyl groups, preferably up to about 24 carbon atoms, alkylene groups such as —CH=CH₂ and related lower alkylene groups, preferably 2 to about 8 carbon atoms, and groups containing hetero atoms and related groups such as alkylene chloride, preferably up to about 14 to 20 carbon atoms;

$R^2$ may be methyl and related alkyl groups containing preferably from 1 to about 14 to 20 carbon atoms, in general $R^2$ can be the same as $R^1$;

$R^3$ may be methyl, or related alkyls of preferably 2 to about 20 carbon atoms or aryls such as phenyl, cycloalkyls, or vinyl or allyl groups, in general $R^3$ can be the same as $R^2$;

$R^4$ may be —CH₂—$_x$, or other moiety such as —CH₂—CH₂—, acetylenic such as —C≡C—, or arylene such as

or ethylenic such as —CH=CH— and related homologous groups; where x is 1 to about 20 and preferably 1 to 10 in value;

$R^5$ may be substituted alkylenes such as

or other well known groups where H and methyl have been replaced to produce the related homologous series that yield many cyclic ethers having alkyl, aryl, alkaryl, arylalkyl and cycloalkyl groups substituted on the carbon in the ring;

$R^6$ may be the same as $R^5$ but is preferably limited to —CH₂—$_x$ where x is 1 to about 6 and preferably 1 or 3 in value; and $R^7$ may be a three valent organic moiety such as

or

BEST MODE FOR CARRYING OUT THE INVENTION

The polymerization can be carried out at an appropriate temperature by contacting preferably in a liquid diluent the olefinic monomer, the organic ether and $BCl_3$ or related Lewis acid. The diluents preferably are hydrocarbons such as n-butane, n-pentane, n-hexane, isopentane, neopentane, benzene, toluene, methylcyclohexane or chlorinated hydrocarbons such as $CH_2Cl_2$, $CH_3Cl$, $C_2H_5Cl$, chlorobenzene, ethylidene dichloride, propyl chloride, to name a few of the representative ones well known to the art. Mixed solvents can be used.

As to the mixing sequence of the ingredients, they may be done without regard to sequence. For example, one can premix the organic ether and $BCl_3$ in a solvent and then add the monomer in a solvent, or premix the ether and the monomer in a solvent and then add the $BCl_3$ in a solvent. Generally, the polymerization starts upon the introduction of the last needed ingredient when the temperature is maintained below the decomposition temperature of the complex which generally is below minus 10° C. but in some cases may be above 40° C. Bulk polymerization, i.e., in the absence of a solvent, can also be carried out.

The polymerization, generally, can be carried out continuously by mixing two streams of chemicals, ether and $BCl_3$ preferably mixed with monomer in appropriate solvents, or ether and monomer mixed with $BCl_3$ or related Lewis acid at a temperature below the decomposition temperature of the complex formed.

In a special embodiment, we also have discovered that the polymerization can be carried out above the decomposition temperature of the complex provided certain precautions are taken, to give savings in refrigeration costs and thus achieve economy in production. These precautions in one embodiment call for the complex of an organic ether with a Lewis acid to be formed below the decomposition temperature of the complex and be maintained below such temperature until their use to initiate the polymerization.

Since the formation of the initiating organic ether-Lewis acid complex is instantaneous, in another embodiment, the reaction can also be carried out by mixing the monomer and initiator, and then introducing the Lewis acid, at a temperature that is higher than the decomposition temperature of the initiating complex. These complexes may have their molecular weight increased by addition of the olefin monomers thereto, either alone, in combination, or in series, at a temperature below or above the complexes' decomposition temperature provided the temperature at which the addition or polymerization of the olefin occurs is such that the rate of decomposition of the complex is low so that the decomposition of the complex does not prevent or occur before the polymerization of the olefin.

In this special embodiment, the premade or in situ made complex of an organic ether and a Lewis acid at a temperature where the half life of the complex is about 5 minutes to an hour or more is mixed with the olefin monomer or monomers with or without suitable solvents at a temperature where the polymerization rate preferably is sufficient to substantially complete the polymerization prior to decomposition of a sufficient amount of the complex to stop or prevent the polymerization going to the desired degree of completion. For instance, the premix of the ether and monomer is made and then mixed with the Lewis acid or, in some cases, mixture of Lewis acid can form the complex essentially instantaneously and thus initiate monomer polymerization and complete said polymerization prior to decomposition of the complex to prevent formation of polymer of the desired molecular weight.

To specifically illustrate this special embodiment, any of the complexes set forth herein or made according to the teachings hereof, could be made at a temperature below its decomposition temperature, for instance about minus 10° to minus 40° C., preferably in a hydrocarbon or chlorohydrocarbon solvent at a very high concentration, viz., a catalyst concentrate. Then, this premade complex is added with mixing to a suitable reactor that contains the olefin monomer at a temperature of about 10° to 50° C., where the complex effects polymerization of the olefin in the mixture at a temperature preferably of about 10° to 50° C. prior to decomposition of sufficient complex to stop the polymerization prior to obtaining a polymer of the desired molecular weight.

In another embodiment, the premade complex made below its decomposition temperature simultaneously is charged and mixed with the monomer to give a mixture above the decomposition temperature of the complex, and the mixing is controlled to give a temperature where the rate of decomposition of the complex is sufficiently so low that the undecomposed complex effects sufficient polymerization of the monomer to give the desired polymer of the desired molecular weight. It being understood that when sufficient of the complex has decomposed, the reaction stops. Thus, we have discovered that polymerization under these special embodiment conditions can be practiced because the rates of polymerizations are relatively fast, usually being complete in a matter of one to three minutes and in nearly all cases, in a matter of 30 minutes while the rate of decomposition is such to give a half life of about 5 minutes to an hour at a temperature of about 20° C. to 30° C. Therefore, not only homopolymers but copolymes and block polymers can be made above the decomposition temperature of the complex when these precautions are taken.

The polymerization most likely occurs by the opening of the ether bond and monomer insertion, as illustrated by the following schematic and illustrative equation:

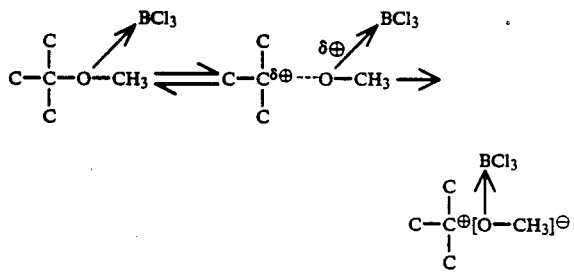

Using the last formula in the above equation, we will exemplify the monomer insertion in the following schematic equation:

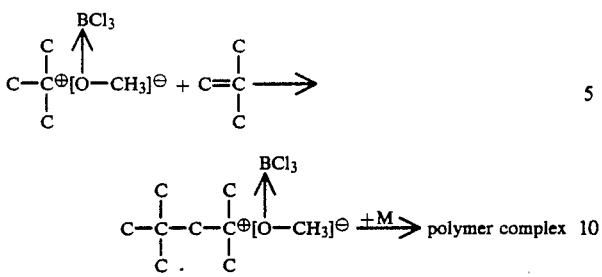

The complex counter anion does not assist or cause proton elimination from the carbocation. This is a very important characteristic that distinguishes our counter anions from other known nonnucleophilic counter anions, e.g., $BCl_4$, $BF_4$, and $AlCl_4$. In conventional polymerizations taking place in the presence of simple nonnucleophilic counter anions, the latter assists or causes proton elimination from the growing carbocationic center and thus a species arises that proceeds to protonate monomer. For example, with $BF_4$ counter anion:

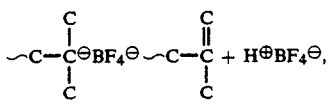

the latter protonates incoming monomer as follows:

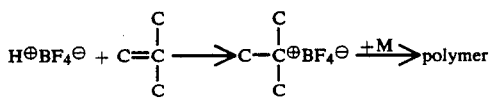

This sequence of events constitutes chain transfer to monomer and it is a most undesirable process for polymer chemists. First of all, this process reduces the molecular weight of the polymer that is formed, and secondly it yields polymers carrying an undesirable unreactive head group:

Molecular weight control in systems that involve chain transfer to monomer is more difficult to achieve than in systems devoid of this process. Thus, an advantage of our invention is it avoids the above two shortcomings.

The complex anion of our invention is supernonnucleophilic and as such does not assist or cause deprotonation of the growing carbocationic center. Thus, chain transfer to monomer will not occur in our systems, and consequently molecular weight control can be accomplished by adjusting the relative concentrations of monomer and initiating system, i.e., molecular weight is a function of $[M]_o/[I]_o$, where the subscripts indicate initial concentrations. The polymer will grow as long as monomer is available and the monomer is not prevented from reacting with the growing center, for example, by the growing center being coagulated from the system or decomposition of sufficient $[I]_o$ to stop the polymerization.

Also on account of the supernonnucleophilic nature of our counter anions, the polymerization is devoid of termination, i.e., the polymerization is terminationless until the temperature exceeds the decomposition temperature of the complex for sufficient time to reduce the $[I]_o$ to zero. The growing center is kept "alive" for extended periods of time without losing its propagating ability. In contrast, in conventional polymerizations termination occurs most likely by a reaction between the growing cation and associated counter anion, for example as set forth hereinafter;

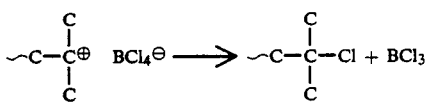

While uninterrupted growth can be maintained for extended periods of time with systems containing supernonnucleophilic counter anions, if termination is desired, say for the preparation of low molecular weight end-functionalyzed polymer, such a premature termination reaction can be brought about by either increasing the temperature of the polymerization system and thus decomposing the active growing complex, or by adding a strong nucleophilic terminating agent, such as methanol or ethanol, pyridine, ammonia, an alkyl amine, or water. Thus, our invention provides a mechanism of varying the molecular weight from several hundreds to the millions. These reactions may result in a Cl-terminated polymer (or a halogen-terminated polymer) most likely because of the following termination reaction:

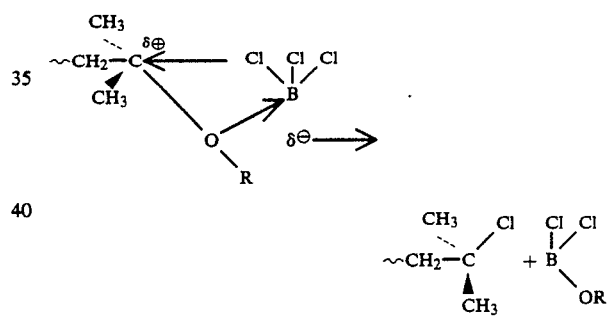

The concurrently formed $BCl_2OR$ is converted to other products. The tert.-chloride end group is a valuable end function and can be used in a variety of well known applications.

Any of the well known olefin-based monomers may be used in this invention to produce polymers. The alpha-olefins having usually from 2 to about 20 and preferably 4 to 8 carbon atoms may be used alone or in conjunction with themselves with a diolefin, either conjugated or nonconjugated, to produce polymers or copolymers of varying molecular weight even as low as 300 to in excess of a million. These polymers can be low molecular weight liquid or viscous polymers of about 200 or 500 to 10,000 molecular weight units or the solid waxy to plastic or elastomeric materials of greater than 100,000 to 500,000 to a million or more molecular weight units. Examples of these olefins are those having 2 to 20 or more carbon atoms and are readily available as specific species such as propylene, butylene, amylenes, hexylenes, heptylenes, octylenes, the styrenes, alpha-methyl styrenes, or the dienes either nonconjugated or conjugated such as butadiene, isoprene, piperylene, hexadienes and the octadienes, and the cyclic analogues of these such as 1,3-cyclohexadiene, to name a few of the well known and representative members.

Examples of the Lewis acids useful in this invention are $BCl_3$, $BF_3$, $AlCl_3$, $SnCl_4$, $TiCl_4$, $SbF_5$, $FeCl_3$ and $ZnCl_2$. Although $BCl_3$ and $TiCl_4$ are the preferred species, the other halogens and the Lewis acids also can be used by replacing one member for another one. Any of the organic ethers may be used provided they form a stable complex with the Lewis acids at a suitable polymerization temperature usually about minus 40° C. up to about 10° to 20° C., or if the rate of decomposition of the complex at higher temperature is lower than the rate of polymerization. Also, the organic ethers can contain usually from 1 to 20 carbon atoms, with those less than 15 carbon atoms being preferred. The mono-, di- and trifunctional ethers offer a means of making polymers having certain specific mono-, di- or tri- end group functions such as chloride.

The nature of this invention and its many aspects and advantages may be more readily understood and appreciated by reference to the following representative and illustrative examples.

The general polymerization process used in Examples 1 to 11 was as follows:

A series of test tube runs were made by charging each test tube with solvent, monomer, viz., isobutylene, sometimes abbreviated as IB herein, and an ether initiator. The polymerization was started by the addition of $BCl_3$ with or without solvent being present with the temperature being as given. The concentrations and results of these runs are given in Tables 1 through 12, according to the experimental run listed. The polymerization was, in most cases, very rapid, i.e., the conversions reached their final values within a few minutes. Nevertheless, to be sure that the reactions did proceed to completion, the polymerization time was extended to 30 minutes. After this time, the reactions were quenched by the addition of 5.0 ml of prechilled methanol. The polymer was recovered by a conventional workup, i.e., evaporation of volatiles, dissolution in n-hexane, decantation or filtration of inorganic residues such as boron compounds or the other Lewis acid residues, removal of hexane by evaporation at room temperature, etc. The fact that the products were not washed insured complete product recovery; i.e., no loss of low molecular weight components. The polymer products were characterized by a variety of techniques including IR, $^1H$ NMR spectroscopy, osmometry and GPC with infrared and ultraviolet detectors.

EXAMPLE 1

A series of experiments were made using methyl tert.-butyl ether (tBuOMe). The results of the individual experiments, a total of 3 runs are shown in Table 1, together with the conditions (i.e., concentration of chemicals) used. In these runs a reactor (60 ml tube) was charged at minus 30° C. under a blanket of $N_2$ with solvent, tBuOMe and isobutylene and at zero time $BCl_3$ was added. The charge was agitated and after 30 minutes at minus 30° C. prechilled MeOH was added to quench the reaction. Work-up was conventional, i.e., the polymer was washed with MeOH, dissolved in n-hexane, filtered and dried. Molecular characterization was effected by GPC.

TABLE 1

| Monomer: | Isobutylene | $[M]_o$ = 1.4 mole/l |
| Coinitiator: | tBuOMe | $[I]_o$ = 5.4 × $10^{-2}$ mole/l |

TABLE 1-continued

| Initiator: | $BCl_3$ | $[BCl_3]_o$ = 1.36 × $10^{-2}$ mole/l |
| Solvent: | | $CH_3Cl$ or $CH_2Cl_2$ (initial charge: 20 ml) |
| Time: | | 30 minutes |
| Temperature: | | minus 30° C. |
| Killing with MeOH (~5 ml, precooled) | | |

| | RUN | | |
|---|---|---|---|
| | 1a | 1b | 1c |
| Solvent | $CH_3Cl$ | $CH_3Cl$ | $CH_2Cl_2$ |
| $[BCl_3]_o$ | 13.6 × $10^{-3}$ | 13.6 × $10^{-3}$ | 13.6 × $10^{-2}$ |
| Conv. % | 18.5 | 40 | 100 |
| $\bar{M}_n$ | 4300 | — | — |
| $\bar{M}_w$ | — | — | — |
| $\bar{M}_w/\bar{M}_n$ | Bimodal | — | — |

EXAMPLE 2

A series of experiments were made using 2,4,4-trimethyl-1-methoxy pentane (TMPOMe) initiator. The reactor was charged with solvent, initiator and monomer at minus 30° C. and then $BCl_3$, was added to effect polymerization. Otherwise the polymerization conditions and characterization methods were the same as those outlined in Example 1. Table 2 shows the reagent concentrations used and results obtained. According to these data TMPOMe is an efficient initiator. Based on a variety of analytical techniques (i.e., $^1H$ NMR spectra), the polymers contain the TMP head group and the tert.-chloro end group as shown by the following formula:

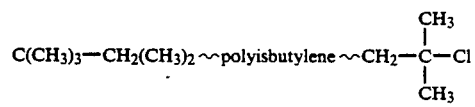

Instead of isobutylene, other olefin monomers may be used to produce the corresponding end group terminated polyolefins, for instance, polyamylene or polyheptylene or the other well known olefin monomers.

In the tables, MeOH is methanol.

TABLE 2

| Monomer: | Isobutylene | $[M]_o$ = 1.7 mole/l |
| Initiator: | TMPOMe | $[I]_o$ = as indicated |
| Coinitiator: | $BCl_3$ | $[BCl_3]_o$ = 3.7 × $10^{-1}$ mole/l |
| Solvent: | $CH_2Cl_2$ | (initial charge: 20 ml) |
| Time: | | 30 minutes |
| Temperature: | | minus 30° C. |
| Killing with MeOH (~5 ml, precooled) | | |

| | RUN | | |
|---|---|---|---|
| | 2a | 2b | 2c |
| $[I]_o$ | 7.6 × $10^{-2}$ | 2.3 × $10^{-2}$ | 7.4 × $10^{-3}$ |
| Conv. % | 100 | 100 | 100 |
| $\bar{M}_n$ | 3,900 | 7,700 | 16,900 |
| $\bar{M}_w$ | 6,600 | 15,400 | 37,200 |
| $\bar{M}_w/\bar{M}_n$ | 1.7 | 2.0 | 2.2 |

EXAMPLE 3

The experimental conditions of Examples 1 and 2 were used in this example except the initiator was 2-phenyl-2-methoxy propane (cumyl methyl ether, CuOMe) and the temperature was varied from minus 30° C. to minus 10° C. The data are shown in Table 3. Spectrographic analysis of the polymers indicated that the polymer contained a phenyl head group and tert.-chloro end group with the following structure:

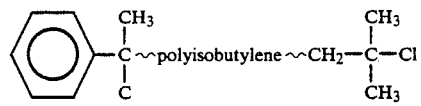

Evidently CuOMe is an excellent living polymerization initiator and the molecular weights can be controlled at will by the following equation: $\overline{M}_n = [\overline{M}]_o/[I]_o$.

TABLE 3

| Monomer: | Isobutylene | $[M]_o = 1.17$ mole/l |
| Initiator: | CuOMe | $[I]_o =$ as indicated |
| Coinitiator: | $BCl_3$ | $[BCl_3]_o = 3.7 \times 10^{-1}$ mole/l |
| Solvents: | $CH_3Cl$ and $CH_2Cl_2$ | (initial charge: 20 ml) |
| Time: | 30 minutes unless otherwise indicated | |
| Killing with MeOH (~5 ml, precooled) | | |

| | RUN | | | | | | | |
|---|---|---|---|---|---|---|---|---|
| | 3a | 3b | 3c | 3d | 3e | 3f | 3g | 3h |
| Solvent | $CH_2Cl_2$ | $CH_2Cl_2$ | $CH_2Cl_2$ | $CH_3Cl$ | $CH_3Cl$ | $CH_3Cl$ | $CH_2Cl_2$ | $CH_2Cl_2$ |
| $[I]_o$ | $7.7 \times 10^{-2}$ | $2.3 \times 10^{-2}$ | $7.4 \times 10^{-3}$ | $7.7 \times 10^{-2}$ | $2.3 \times 10^{-2}$ | $7.4 \times 10^{-3}$ | $2.3 \times 10^{-2}$ | $7.4 \times 10^{-3}$ |
| Temp. °C. | −30 | −30 | −30 | −30 | −30 | −30 | −10 | −10 |
| Conv. % | 100 | 100 | 100* | 100 | 100 | 100* | 100 | 100* |
| $\overline{M}_n$ | 1500 | 4650 | 13700 | 960 | 3600 | 14700 | 5000 | 12000 |
| $\overline{M}_w$ | 5000 | 14000 | 30000 | 2900 | 8600 | 29000 | 15000 | 36000 |
| $\overline{M}_w/\overline{M}_n$ | 3.3 | 3.0 | 2.2 | 3.0 | 2.3 | 1.9 | 3.0 | 3.0 |

*conversions were ~100% after 1 minute

EXAMPLE 4

In this series of experiments carried out at minus 10° C. under conditions essentially the same to those used in Experiments 1-3, the monomer concentrations were varied. The initiator was CuOMe. The conditions (concentrations) and results are summarized in Table 4. It is of interest that a plot of $1\overline{DP}_n$ (reciprocal number average degrees of polymerization) versus $1/[M]_o$ (reciprocal monomer concentration) gives a straight line starting at the origin. The fact that this so called "Mayo plot" shows no intercept indicates the absence of chain transfer to monomer, i.e., the presence of living polymerizations.

TABLE 4

| Monomer: | Isobutylene | $[M]_o =$ as stated, mole/l |
| Initiator: | CuOMe | $[I]_o = 5.76 \times 10^{-3}$ mole/l |
| Coinitiator: | $BCl_3$ | $[BCl_3] = 1.55 \times 10^{-1}$ mole/l |
| Solvent: | $CH_2Cl_2$ | (initial charge: 20 ml) |

Time: 30 minutes
Temperature: minus 10° C.
Killing with MeOH (~5 ml, precooled)

| | RUN | | | | |
|---|---|---|---|---|---|
| | 4a | 4b | 4c | 4d | 4e |
| $[M]_o$ | 0.282 | 0.564 | 0.864 | 1.228 | 1.58 |
| Conv. % | 100 | 100 | 100 | 100 | 100 |
| $\overline{M}_n$ | 3080 | 7100 | 11900 | 13300 | 14900 |
| $\overline{M}_w$ | 7600 | 17900 | 24850 | 28400 | 32900 |
| $I_{eff}\%$ | 94 | 79 | 70 | 84 | 93 |
| $\overline{M}_w/\overline{M}_n$ | 2.4 | 2.5 | 2.0 | 2.1 | 2.2 |

EXAMPLE 5

In this experimental series a difunctional initiator 1,4-bis(2-methoxy propane)benzene (also called dicumyl methoxy, DiCuOMe) has been used at minus 30° and minus 10° C. under the general conditions used in Examples 1-4. Due to the difunctional nature of this initiator a difunctional telechelic polymer with the following structure has been obtained:

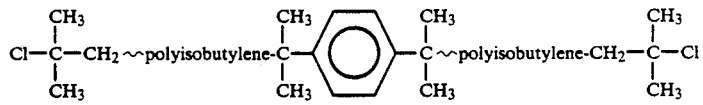

The number of isobutylene units incorporated into the polymer is determined by the $[M]_o/[I]_o$ ratio. Table 5 shows the experimental conditions and summarizes the results.

By using different olefin monomers, difunctional telechelic polymers may be made, for example, a block polymer of isoprene-isobutylene or butadiene-octylene by controlling feed of the monomers.

TABLE 5

| Monomer: | Isobutylene | $[M]_o = 1.173$ mole/l |
| Initiator: | DiCuOMe | $[I]_o -$ as indicated mole/l |
| Coinitiator: | $BCl_3$ | $[BCl_3] = 3.7 \times 10^{-1}$ mole/l |
| Time: | 30 minutes or otherwise stated | |
| Temperature: | as indicated | |
| Solvents: | $CH_3Cl$ and $CH_2Cl_2$ (initial charge: 20 ml) | |
| Killing with MeOH (~5 ml, precooled) | | |

| | RUN | | | | | |
|---|---|---|---|---|---|---|
| | 5a | 5b | 5c | 5d | 5e | 5f |
| $[I]_o$ | $2.36 \times 10^{-2}$ | $7.47 \times 10^{-3}$ | $2.36 \times 10^{-2}$ | $7.47 \times 10^{-2}$ | $2.36 \times 10^{-2}$ | $7.47 \times 10^{-2}$ |
| Solvent | $CH_2Cl_2$ | $CH_2Cl_2$ | $CH_3Cl$ | $CH_3Cl$ | $CH_2Cl_2$ | $CH_2Cl$ |
| Temp. °C. | −30 | −30 | −30 | −30 | −10 | −10 |
| Conv. % | 100 | 100* | 100 | 100* | 100 | 100 |
| $\overline{M}_n$ | 3600 | 9400 | 3050 | 10100 | 3400 | 8300 |

TABLE 5-continued

| $\overline{M_w}$ | 9300 | 20550 | 8300 | 19000 | 10200 | 18500 |
|---|---|---|---|---|---|---|
| $\overline{M_w}/\overline{M_n}$ | 2.6 | 2.1 | 2.7 | 1.8 | 3.0 | 2.2 |
| $I_{eff}\%$ | 84 | 96 | 98 | 90 | 88 | 108 |

*Conversions were ~100% after 1 minute

EXAMPLE 6

This series of experiments was similar to those summarized in Example 4. The purpose of this series was to demonstrate the absence of chain transfer to the monomer. The results are shown in Table 6. When the $1/\overline{DP_n}$ was plotted against $1/[M]_o$, a straight line was obtained starting from the origin. The absence of the intercept indicates absence of chain transfer to monomer, i.e., living polymerizations.

TABLE 6

| Monomer: | Isobutylene | $[M]_o$ = as stated mole/l |
|---|---|---|
| Initiator: | DiCuOMe | $[I]_o = 5.92 \times 10^{-3}$ mole/l |
| Coinitiator: | BCl3 | $[BCl_3] = 3.1 \times 10^{-1}$ mole/l |
| Solvent: | CH2Cl2 | (initial charge: 20 ml) |
| Temperature: | minus 10° C. | |
| Time: | 30 minutes | |
| Killing with MeOH (~5 ml, precooled) | | |

| | RUN | | | | |
|---|---|---|---|---|---|
| | 6a | 6b | 6c | 6d | 63 |
| $[M]_o$ | 0.282 | 0.564 | 0.846 | 1.128 | 1.58 |
| Conv. % | 100 | 100 | 100 | 100 | 100 |
| $\overline{M_n}$ | 2600 | 5400 | 8250 | 12000 | 13400 |
| $\overline{M_w}$ | 5700 | 10000 | 16700 | 22300 | 22900 |
| $\overline{M_w}/\overline{M_n}$ | 1.0 | 1.8 | 2.0 | 1.8 | 1.7 |
| $I_{eff}\%$ | ~100 | ~100 | ~100 | 91 | 93 |

EXAMPLE 7

In these experiments, we have employed 2,2'-dimethoxy propane (DMP) as bifunctional initiator under the general experimental conditions used in Examples 1-4. Table 7 shows the reagent concentrations and summarizes the results.

TABLE 7

| Monomer: | Isobutylene | $[M]_o$ = as indicated mole/l |
|---|---|---|
| Initiator: | DMP | $[I]_o$ = as indicated mole/l |
| Coinitiator: | BCl3 | $[BCl_3]$ = as indicated mole/l |
| Solvent: | CH3Cl or CH2Cl2 | (initial charge: 20 ml) |
| Temperature: | minus 30° C. | |
| Time: | 30 minutes | |
| Killing with MeOH (~5 ml, precooled) | | |

| | RUN | | | |
|---|---|---|---|---|
| | 7a | 7b | 7c | 7d |
| Solvent | CH2Cl2 | CH2Cl2 | CH2Cl2 | CH3Cl |
| $[I]_o$ | $2.7 \times 10^{-2}$ | $5.4 \times 10^{-2}$ | $8.2 \times 10^{-2}$ | $8.2 \times 10^{-2}$ |
| $[BCl_3]$ | $13.6 \times 10^{-2}$ | $27.2 \times 10^{-2}$ | $40.4 \times 10^{-2}$ | $40.4 \times 10^{-2}$ |
| $[M]_o$ | 1.4 | 1.4 | 2.08 | 2.08 |
| Conv. % | 27 | 37 | 75 | 25 |
| $\overline{M_n}$ | 4000 | 2300 | 1500 | 800 |

EXAMPLE 8

In this experimental series a trifunctional initiator 1,3,5-tris(2-methoxy propane)benzene (also called tricumyl methoxy, TCuOMe) has been used at minus 30° under the general conditions used in Examples 1-4. Due to the trifunctional nature of this initiator, a trifunctional telechelic polymer with the following structure has been obtained:

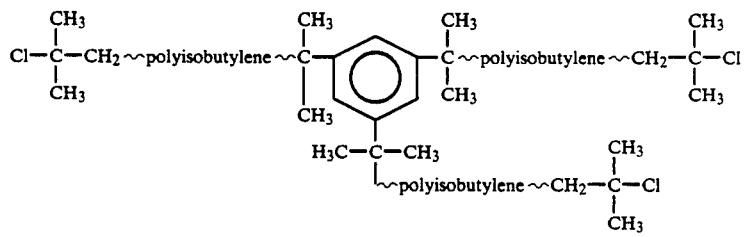

The structure of the end groups has been proven by proton NMR spectroscopy. The number of isobutylene units incorporated into the three-arm star polymer is determined by the $[M]_o/[I]_o$ ratio. Table 8 shows the experimental conditions and summarizes the results.

TABLE 8

| Monomer: | Isobutylene, 1.0 mole/l |
|---|---|
| Initiator, $[I]_o$ | 1,3,5-tris(2-methoxy propane)benzene, TCuOMe |
| Coinitiator: | BCl3, $5.16 \times 10^{-1}$ mole/l |
| Solvent: | CH3Cl or CH2Cl2, 23.5 ml |
| Polymerization Time: | 30 minutes |
| Temperature: | minus 30° C. |
| Killing with MeOH (~5 ml, precooled) | |

| | RUN | | | | | |
|---|---|---|---|---|---|---|
| | 8a | 8b | 8c | 8d | 8e | 8f |
| Solvent | CH3Cl | CH3Cl | CH3Cl | CH2Cl2 | CH2Cl2 | CH2Cl2 |
| $[I]_o$ mole/l | $5.59 \times 10^{-2}$ | $1.86 \times 10^{-2}$ | $6.2 \times 10^{-3}$ | $5.59 \times 10^{-2}$ | $1.86 \times 10^{-2}$ | $6.2 \times 10^{-3}$ |
| Conv., % | 100 | 100 | 100 | 100 | 100 | 100 |
| $\overline{M_n}$ | 1300 | 4800 | 14700 | 1350 | 5500 | 13700 |
| $\overline{M_w}/\overline{M_n}$ | 1.7 | 1.5 | 1.3 | 2.1 | 1.7 | 1.5 |

EXAMPLE 9

The following experiments concern investigations to illustrate the scope of the invention. In all these experiments the BCl₃, is added to various initiator-isobutylene charges in CH₂Cl₂ solvent at minus 10° C. and the conversions are noted after 30 minutes of reaction time. Table 9 shows conditions and observations.

TABLE 9

Monomer: Isobutylene $[M]_o = 1.17$ mole/l
Initiator: Various ethers $[I]_o = 2.3 \times 10^{-2}$ mole/l
Coinitiator: BCl₃ $[BCl_3] = 3.7 \times 10^{-1}$ mole/l
Time: 30 minutes or otherwise as stated
Temperature: minus 10° C.
Solvent: CH₂Cl₂ (initial charge: 20 ml)
Killing with MeOH (~5 ml, precooled)

| RUN | ETHER | OBSERVATION |
|---|---|---|
| 9a | MeO—C(CH₃)₂—CH₂—CH₂—C(CH₃)₂—OMe | Copious amount of polymer |
| 9b | MeO—C(CH₃)₂—CH=CH—C(CH₃)₂—OMe | Copious amount of polymer |
| 9c | MeO—C(CH₃)₂—C≡C—C(CH₃)₂—OMe | Copious amount of polymer |
| 9d | MeO—C(CH₃)₂—CH₂—C(CH₃)₂—CH₂—C(CH₃)₂—OMe | Copious amount of polymer |
| 9e | HC(CH₃)₂—O—CH(CH₃)₂ | Copious amount of polymer |
| 9f | CH₃—C(CH₃)₂—C(CH₃)(H)—OMe | Copious amount of polymer |
| 9g | (CH₃)₂CH—CH(OMe)—CH(CH₃)₂ | Copious amount of Polymer |
| 9h | HC=C(CH₃)(OMe)(CH₃) | Copious amount of Polymer |
| 9i | (CH₃CH₂)₂CH—OMe | Copious amount of Polymer |
| 9j | 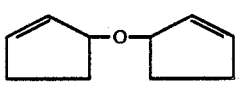 | Copious amount of Polymer |
| 9k |  | Copious amount of Polymer |
| 9l |  | Copious amount of Polymer |

TABLE 9-continued

Monomer: Isobutylene $[M]_o$ = 1.17 mole/l
Initiator: Various ethers $[I]_o$ = 2.3 × $10^{-2}$ mole/l
Coinitiator: $BCl_3$ $[BCl_3]$ = 3.7 × $10^{-1}$ mole/l
Time: 30 minutes or otherwise as stated
Temperature: minus 10° C.
Solvent: $CH_2Cl_2$ (initial charge: 20 ml)
Killing with MeOH (~5 ml, precooled)

| RUN | ETHER | OBSERVATION |
|---|---|---|
| 9m | (2,2,5,5-tetramethyltetrahydrofuran structure) | Copious amount of Polymer |
| 9n | $CH_3O-C(Ph)(Ph)-OCH_3$ | Copious amount of Polymer |
| 9o | $CH_3-CH_2-C(CH_3)(OMe)-C(CH_3)(CH_3)(H)$ | Copious Amount of Polymer |
| 9p | $MeO-C(CH_3)(CH_3)-C(CH_3)(CH_3)-OMe$ | Copious Amount of Polymer |
| 9q | $(CH_3)_2C=CH-CH_2-OMe$ | Copious Amount of Polymer |
| 9r | $CH_2=CH-CH_2-C(H)(CH_3)-OMe$ | Copious Amount of Polymer |
| 9s | $CH_3-CH=CH-C(H)(CH_3)-OMe$ | Copious Amount of Polymer |
| 9t | $C\equiv C-C(OMe)-C(H)(CH_3)(CH_3)$ | Copious Amount of Polymer |
| 9u | $MeO-C(H)(CH_3)-C=C-C(H)(CH_3)-OMe$ | Copious Amount of Polymer |
| 9v | $HC(CH_3)(OMe)(Ph)$ | Copious amount of Polymer |

TABLE 9-continued

Monomer: Isobutylene [M]$_o$ = 1.17 mole/l
Initiator: Various ethers [I]$_o$ = 2.3 × 10$^{-2}$ mole/l
Coinitiator: BCl$_3$ [BCl$_3$] = 3.7 × 10$^{-1}$ mole/l
Time: 30 minutes or otherwise as stated
Temperature: minus 10° C.
Solvent: CH$_2$Cl$_2$ (initial charge: 20 ml)
Killing with MeOH (~5 ml, precooled)

| RUN | ETHER | OBSERVATION |
|---|---|---|
| 9w | Ph$_2$CH—OMe (diphenylmethyl methyl ether) | Copious amount of Polymer |
| 9x | Ph$_2$C(CH$_3$)—OMe | Copious amount of Polymer |
| 9y | MeO—C(Ph)$_2$—CH$_2$—CH$_2$—C(Ph)$_2$—OMe | Copious amount of Polymer |
| 9z | HC{—C$_6$H$_4$—C(CH$_3$)$_2$—OMe}$_3$ | Copious amount of Polymer |

EXAMPLE 10

Similarly to Example 9, scouting experiments are carried out with styrene as the olefinic monomer. In a series of tubes containing CH$_2$Cl$_2$ solvent, the initiator, and styrene, BCl$_3$ is added at minus 10° C. and the yield is noted after 30 minutes of reaction time.

TABLE 10

Monomer: Styrene [M]$_o$ = 1.17 mole/l
Initiator: Various ethers [I]$_o$ = 2.3 × 10$^{-2}$ mole/l
Coinitiator: BCl$_3$ [BCl$_3$] = 3.7 × 10$^{-1}$ mole/l
Time: 30 minutes or otherwise stated
Temperature: minus 10° C.
Solvent: CH$_2$Cl$_2$ (initial charge: 20 ml)
Killing with MeOH (~5 ml, precooled)

| RUN | ETHER | OBSERVATION |
|---|---|---|
| 10a | MeO—C(CH$_3$)$_2$—CH=CH—C(CH$_3$)$_2$—OMe | Copious amount of Polymer |

TABLE 10-continued

Monomer: Styrene [M]$_o$ = 1.17 mole/l
Initiator: Various ethers [I]$_o$ = 2.3 × 10$^{-2}$ mole/l
Coinitiator: BCl$_3$ [BCl$_3$] = 3.7 × 10$^{-1}$ mole/l
Time: 30 minutes or otherwise stated
Temperature: minus 10° C.
Solvent: CH$_2$Cl$_2$ (initial charge: 20 ml)
Killing with MeOH (~5 ml, precooled)

| RUN | ETHER | OBSERVATION |
|---|---|---|
| 10b | 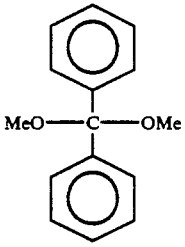 | Copious amount of Polymer |
| 10c | MeO—C(CH$_3$)$_2$—CH$_2$—C(CH$_3$)$_2$—CH$_2$—C(CH$_3$)$_2$—OMe | Copious amount of Polymer |
| 10d | Ph—C(CH$_3$)$_2$—OMe | Copious amount of Polymer |
| 10e | MeO—C(CH$_3$)$_2$—C$_6$H$_4$—C(CH$_3$)$_2$—OMe | Copious amount of Polymer |
| 10f | (CH$_3$)$_3$C—CH$_2$—C(CH$_3$)$_2$OMe | Copious amount of Polymer |

EXAMPLE 11

To prove the living nature of IB or related olefins initiated by the supernonnucleophilic counter anion complex, a number of experiments were run and then linear plots of $\overline{M}_n$ versus grams of polymer formed in the reactor were constructed to see if the plots are linear and that they cross the origin on extrapolation.

These series of experiments were run in a series of test tubes which were charged with 20 ml CH$_2$Cl$_2$ 2,4,4-trimethyl-2-methoxy pentane hereinafter called TMPOMe (5.76×10$^{-3}$ mole/l) and 0.5 ml IB, in that order, and thermoequilibrated at minus 30° C. Then the polymerization was started by introducing 0.25 ml BCl$_3$ (liquefied) into the test tubes. The BCl$_3$ concentration was 1.55×10$^{-1}$ mol/l in the reactor. After 30 minutes of reaction time, the reaction in the first of the test tubes was killed by the addition of methanol, whereas an additional 0.5 ml IB was added to the rest of the tubes. After 30 minutes, the reaction in the second tube was killed whereas an additional 0.5 ml IB was added to the remaining tubes. This procedure was repeated until all the charges in the series of test tubes had been quenched. After conventional workup, the amount of polymer and its molecular weight and molecular weight distribution were determined. These data are given in Table 11. A plot of the $\overline{M}_n$s in Table 11 versus the grams of PIB formed gave a straight line passing through the origin which indicates a living system.

TABLE 11

Monomer: Isobutylene
Initiator: TMPOMe [I]$_o$ = 4.89 × 10$^{-3}$ mole/l
Coinitiator: BCl$_3$ [BCl$_3$] = 1.55 × 10$^{-1}$ mole/l
Solvent: CH$_2$Cl$_2$ (initial charge: 20 ml)
Polymerization time: 30 minutes between each addition
Temperature: minus 30° C.
Killing with MeOH (~5 ml, precooled)

| Run | Isobutylene Added, ml | $\overline{M}_n$ | $\overline{M}_w$ | $\overline{M}_w/\overline{M}_n$ | Polymer formed, g |
|---|---|---|---|---|---|
| 11a | 0.5 | 7000 | 11900 | 1.7 | 0.28 |
| 11b | 0.5 + 0.5 | 13400 | 21400 | 1.6 | 0.56 |
| 11c | 0.5 + 0.5 + 0.5 | 17050 | 27300 | 1.6 | 0.82 |
| 11d | 0.5 + 0.5 + 0.5 + 0.5 | 19800 | 29700 | 1.5 | 1.11 |

EXAMPLE 12

An essentially identical series of experiments described in Example 11 was carried out except in this series of runs the TMPOMe was premixed with BCl$_3$, and the system was aged for 30 minutes at minus 30° C. before the first IB amount was added. Aging was effected because it was thought that initiation occurs by an ionic species formed from the ether plus BCl$_3$ and that ionization may need some time:

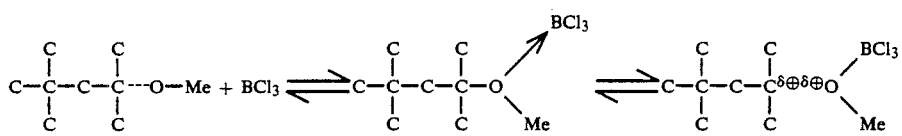

Table 12 shows the data. Indeed, we have obtained theoretical molecular weights, i.e., $\overline{M}_n = [M]_o/[I]_o$, and the $\overline{M}_n$ versus g polymer formed plot was linear starting from the origin indicating a living polymerization system.

TABLE 12

| Monomer: | Isobutylene | |
|---|---|---|
| Initiator: | TMPOMe | $[I]_o = 4.89 \times 10^{-3}$ mole/l |
| Coinitiator: | BCl$_3$ | $[BCl_3] = 1.55 \times 10^{-1}$ mole/l |
| Solvent: | CH$_2$Cl$_2$ | (initial charge: 20 ml) |
| Polymerization Time: | 30 minutes between each addition | |
| Temperature: | minus 30° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 12a | 0.5 | 4700 | 17400 | 3.7 | 0.35 |
| 12b | 0.5 + 0.5 | 9600 | 19200 | 2.0 | 0.69 |
| 12c | 0.5 + 0.5 + 0.5 | 11500 | 19500 | 1.7 | 0.95 |
| 12d | 0.5 + 0.5 + 0.5 + 0.5 | 14500 | 24500 | 1.7 | 1.31 |
| 12e | 0.5 + 0.5 + 0.5 + 0.5 + 0.5 | 15400 | 26000 | 1.7 | 1.52 |

EXAMPLE 13

An identical series of experiments described in Example 11 has been carried out with the 2-phenyl-2-methoxy propane (CuOMe) initiator with BCl$_3$ cointiator in CH$_3$Cl at minus 30° C. The data are shown in Table 13. The $\overline{M}_n$ versus g polymer formed plot gave a straight line passing through the origin indicating a living system. The molecular weights were theoretical, i.e., $\overline{M}_n = [M]_o/[I]_o$ indicating a living system.

TABLE 13

| Monomer: | Isobutylene | |
|---|---|---|
| Initiator: | CuOMe | $[I]_o = 5.76 \times 10^{-3}$ mole/l |
| Coinitiator: | BCl$_3$ | $[BCl_3] = 1.55 \times 10^{-1}$ mole/l |
| Solvent: | CH$_2$Cl$_2$ | (initial charge: 20 ml) |
| Polymerization Time: | 30 minutes between each addition | |
| Temperature: | minus 30° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 13a | 0.5 | 4200 | 10100 | 2.4 | 0.32 |
| 13b | 0.5 + 0.5 | 7600 | 22800 | 3.0 | 0.60 |
| 13c | 0.5 + 0.5 + 0.5 | 9400 | 18800 | 2.0 | 0.89 |
| 13d | 0.5 + 0.5 + 0.5 + 0.5 | 13500 | 35100 | 2.6 | 1.27 |
| 13e | 0.5 + 0.5 + 0.5 + 0.5 + 0.5 | 14900 | 35800 | 2.4 | 1.55 |

EXAMPLE 14

An identical series of experiments described in Example 13 has been carried out except in these runs CH$_3$Cl was used as the solvent. Table 14 shows the data. The plot of the $\overline{M}_n$ data gave a straight line passing through the origin indicating a living system. The molecular weights were theoretical, i.e., $\overline{M}_n = [M]_o/[I]_o$ indicating a living system.

TABLE 14

| Monomer: | Isobutylene | |
|---|---|---|
| Initiator: | CuOMe | $[I]_o = 5.76 \times 10^{-3}$ mole/l |
| Coinitiator: | BCl$_3$ | $[BCl_3] = 1.55 \times 10^{-1}$ mole/l |
| Solvent: | CH$_3$Cl | (initial charge: 20 ml) |
| Polymerization Time: | 30 minutes between each addition | |
| Temperature: | minus 30° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 14a | 0.5 | 3900 | 7800 | 2.0 | 0.31 |
| 14b | 0.5 + 0.5 | 5400 | 12900 | 2.4 | 0.53 |
| 14c | 0.5 + 0.5 + 0.5 | 8700 | 20000 | 2.3 | 0.81 |
| 14d | 0.5 + 0.5 + 0.5 + 0.5 | 12200 | 23200 | 1.9 | 1.15 |
| 14e | 0.5 + 0.5 + 0.5 + 0.5 + 0.5 | 14200 | 28400 | 2.0 | 1.29 |

EXAMPLE 15

In this series of experiments we have used the bifunctional initiator 1,4-bis(2-methoxy propane)benzene (Di-CuOMe) in CH$_3$Cl solvent to demonstrate living polymerization with a bifunctional ether and to produce an $\alpha,\omega$-difunctional tert.-chloro telechelic polyisobutylene. The general experimental conditions were identical to those in Experiments 11, 13 and 14. Table 15 shows the data. Close to theoretical molecular weights were obtained. A plot of $\overline{M}_n$ versus g polymer formed gave a straight line starting at the origin. Evidently the system was a living one.

TABLE 15

| Monomer: | Isobutylene | |
|---|---|---|
| Initiator: | DiCuOMe | $[I]_o = 5.92 \times 10^{-3}$ mole/l |
| Coinitiator: | BCl$_3$ | $[BCl_3] = 3.1 \times 10^{-1}$ mole/l |
| Solvent: | CH$_3$Cl | (initial charge: 20 ml) |
| Polymerization Time: | 30 minutes between each addition | |
| Temperature: | minus 30° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 15a | 0.5 | 4000 | 8000 | 2.0 | 0.32 |
| 15b | 0.5 + 0.5 | 7200 | 13000 | 1.8 | 0.56 |
| 15c | 0.5 + 0.5 + 0.5 | 11400 | 17100 | 1.5 | 0.88 |
| 15d | 0.5 + 0.5 + 0.5 + 0.5 | 12600 | 18900 | 1.5 | 1.05 |
| 15e | 0.5 + 0.5 + 0.5 + 0.5 + 0.5 | 16200 | 22700 | 1.4 | 1.33 |

EXAMPLE 16

This experimental series was identical to that described in Example 15, except we used CH$_2$Cl$_2$ solvent. An α,ω-bifunctional tert.-chloro telechelic polymer was obtained. The molecular weights were theoretical, determined by $\overline{M}_n = [M]_o/[I]_o$. The plot of $\overline{M}_n$ versus g polymer formed gave a straight line starting from the origin, indicating a living system. Table 16 shows the data.

TABLE 16

| Monomer: | Isobutylene | |
|---|---|---|
| Initiator: | DiCuOMe | $[I]_o = 5.92 \times 10^{-3}$ mole/l |
| Coinitiator: | BCl$_3$ | $[BCl_3] = 3.1 \times 10^{-1}$ mole/l |
| Solvent: | CH$_2$Cl$_2$ | (initial charge: 20 ml) |
| Polymerization Time: | 30 minutes between each addition | |
| Temperature: | minus 30° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 16a | 0.5 | 3600 | 7200 | 2.0 | 0.35 |
| 16b | 0.5 + 0.5 | 7700 | 12300 | 1.6 | 0.68 |
| 16c | 0.5 + 0.5 + 0.5 | 9700 | 15500 | 1.6 | 1.00 |
| 16d | 0.5 + 0.5 + 0.5 + 0.5 | 12500 | 21200 | 1.7 | 1.34 |
| 16e | 0.5 + 0.5 + 0.5 + 0.5 + 0.5 | 13200 | 22400 | 1.7 | 1.63 |

EXAMPLE 17

This series of experiments demonstrates that living polymerizations can be obtained at minus 10° C. if the BCl$_3$ coinitiator is added to a series of charges containing the CuOMe initiator and an increasing amount of IB. Table 17 shows the data. A plot of $\overline{M}_n$ versus g polymer formed gave a straight line starting at the origin. The molecular weights were determined by $\overline{M}_n = [M]_o/[I]_o$. According to these data living polymerizations can readily be obtained at minus 10° C.

TABLE 17

| Monomer: | Isobutylene | |
|---|---|---|
| Initiator: | CuOMe | $[I]_o = 5.76 \times 10^{-3}$ mole/l |
| Coinitiator: | BCl$_3$ | $[BCl_3] = 1.55 \times 10^{-1}$ mole/l |
| Solvent: | CH$_2$Cl$_2$ | (initial charge: 20 ml) |
| Polymerization Time: | 30 minutes between each addition | |
| Temperature: | minus 10° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 17a | 0.5 | 3100 | 7600 | 2.4 | 0.31 |
| 17b | 1.0 | 7100 | 17900 | 2.5 | 0.59 |
| 17c | 1.5 | 11900 | 24850 | 2.1 | 0.94 |
| 17d | 2.0 | 13300 | 28400 | 2.1 | 1.23 |
| 17e | 2.5 | 14900 | 32900 | 2.2 | 1.57 |

EXAMPLE 18

This series of experiments was carried out with the bifunctional ether DiCuOMe initiator at minus 10° C. The purpose of this experiment and the general conditions were the same as those described in Experiment 17. Table 18 shows the data. A plot of $\overline{M}_n$ versus g polymer formed gave a straight line starting at the origin. The molecular weights were theoretical and determined by $\overline{M}_n = [M]_o/[I]_o$. These data indicate a living polymerization system.

TABLE 18

| Monomer: | Isobutylene | |
|---|---|---|
| Initiator: | DiCuOMe | $[I]_o = 5.92 \times 10^{-3}$ mole/l |
| Coinitiator: | BCl$_3$ | $[BCl_3] = 3.1 \times 10^{-1}$ mole/l |
| Solvent: | CH$_2$Cl$_2$ | (initial charge: 20 ml) |
| Polymerization Time: | 30 minutes between each addition | |
| Temperature: | minus 10° C. | |
| Killing with MeOH (~5 ml, precooled) | | |

| Run | Isobutylene added, ml | $\overline{M}_n$ | $\overline{M}_w$ | $\overline{M}_w/\overline{M}_n$ | Polymer formed, g |
|---|---|---|---|---|---|
| 18a | 0.5 | 2600 | 5400 | 2.0 | 0.28 |
| 18b | 1.0 | 5400 | 10000 | 1.8 | 0.58 |
| 18c | 1.5 | 8250 | 16900 | 2.0 | 0.88 |
| 18d | 2.0 | 12000 | 22300 | 1.8 | 1.24 |
| 18e | 2.5 | 13400 | 22800 | 1.7 | 1.46 |

EXAMPLE 19

This series of experiments was carried out with the trifunctional ether TCuOMe initiator at minus 30° C. The purpose of this experiment was to demonstrate that living polymerization can be obtained by a trifunctional initiating system. The general experimental conditions were the same as those described in Experiment 17.

Table 19 shows the data. A plot of $\overline{M}_n$ versus g polyisobutylene formed gave a straight line starting at the origin. The molecular weights were close to theoretical and determined by $\overline{M}_n = [M]_o/[I]_o$. These data indicate a living polymerization system.

TABLE 19

| Monomer: | Isobutylene |
|---|---|
| Initiator: | TCuOMe $[I]_o = 4.3 \times 10^{-3}$ mole/l |
| Coinitiator: | BCl$_3$ [BCl$_3$] $= 1.98 \times 10^{-1}$ mole/l |
| Solvent: | CH$_3$Cl, initial charge 25 ml |
| Polymerization Time: | 30 minutes between addition |
| Temperature: | minus 30° C. |

| Run | Isobutylene Added, ml | $\overline{M}_n$ | $\overline{M}_w/\overline{M}_n$ | Polymer formed, g |
|---|---|---|---|---|
| 19a | 0.5 | 3550 | 1.36 | 0.252 |
| 19b | 0.5 + 0.5 | 7400 | 1.4 | 0.443 |
| 19c | 0.5 + 0.5 + 0.5 | 10800 | 1.4 | 0.623 |
| 19d | 0.5 + 0.5 + 0.5 + 0.5 | 14650 | 1.36 | 0.773 |
| 19e | 0.5 + 0.5 + 0.5 + 0.5 + 0.5 | 16800 | 1.29 | 0.949 |

EXAMPLE 20

Experiments have been carried out to study the end groups obtained in ether/Lewis acid induced isobutylene polymerizations. According to model experiments in which methyltert.butyl ether or 2,4,4-trimethyl-2-methoxy pentane is heated in the presence of BCl$_3$ the corresponding alkyl chloride is formed:

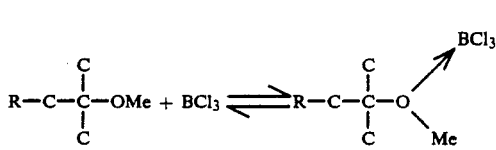
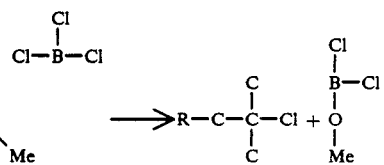

where R = H or C(CH$_3$)$_3$-. Similar results are obtained when methanol is added at minus 10° C. Thus under the polymerization conditions the tert.-chloro end group is obtained. It is immediately apparent that by the use of bifunctional ether/BCl$_3$ complex initiators, i.e., CH$_3$—O—C(CH$_3$)$_2$—O—CH$_3$, valuable diterminal telechelic polymers can be prepared.

A special embodiment of this invention relates to the random copolymerization of an alpha-olefin such as those exemplified by isobutylene, propylene, pentene or hexene, with a diolefin, preferably a conjugated one such as those exemplified by isoprene, butadiene and piperylene. Thus, copolymers containing either a major or minor amount of diolefin can be produced. Isobutylene plus an isoprene copolymer containing up to 5 percent isoprene in the chain are articles of commerce. The random polymers produced by this invention have commercial utility as butyl rubbers and especially those having a molecular weight of a hundred thousand and 1 to 4 percent unsaturation. These rubbers are sulfur-vulcanizable, heat stable, chemically resistant general purpose rubbers which may be used in inner tubes and inner liners of tires, tubes, curing bladders, mountings, vibration dampers, etc., and are convertible to the halogenated form of butyl rubber for other usages. Heretofore, butyl rubber was made commercially by a heterogeneous low temperature (minus 100° C.) cationic suspension polymerization by the use of AlCl$_3$ catalyst in methyl chloride diluent. In order to obtain commercially useful molecular weights, the polymerization has to be carried out at cryogenic temperatures, viz., below minus 100° C. Therefore, a lot of work has been directed towards the raising of this very low temperature requirement. Also, controlling molecular weight with the AlCl$_3$ system is difficult, it requires changes in reactor temperature. Another problem with conventional polymerizations is reactor fauling. Fauling is the process during which polymer particles crosslink and agglomerate during the run and precipitate on the inner surfaces of the reactor. This adhering layer of crosslinked or gelled polymer decreases cooling efficiency so that molecular weight control becomes impossible. Thus, the reactor has to be shut off and the fauled polymer layer removed by a separate cumbersome and costly process. Great efforts have been extended to overcome fauling.

In Example 21, copolymerization of isobutylene with isoprene was demonstrated to occur readily with our complex catalyst.

EXAMPLE 21

A series of copolymerization experiments have been carried out under the following conditions: A series of three test tubes have been charged at minus 30° C. with 22.5 ml CH$_3$Cl, 2.0 ml isobutylene (0.94 mole/l) and 0.1 g cumyl methyl ether (0.66 × 10$^{-3}$ mole) in that order. Then in a series of three test tubes, isoprene was introduced, i.e., 0.05 ml (or 2.13 mole percent on isobutylene); 0.1 ml (or 4.26 mole percent on isobutylene); and 0.2 ml (or 8.52 mole percent on isobutylene) isoprene.

Finally, the copolymerizations were initiated by the introduction of 0.5 ml BCl$_3$ (2.8 10$^{-1}$ mole/l). The polymerizations proceeded with occasional mixings at minus 30° C. for 30 minutes. Then the reactions were killed by adding 3 ml of prechilled methanol. Copious amounts of polymers have been obtained in all these experiments.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A method of producing a living polymer complex exhibiting supernonnucleophilic counter anions comprising the steps of:
    a. reacting a Lewis acid and an organic ether at −10° C. or lower to yield a carbocationic center; and
    b. reacting said carbocationic center with an olefin monomer to yield said living polymer complex wherein said supernonnucleophilic counter anions do not cause deprotonation of the growing living polymer complex and chain transfer to the monomer does not occur.

2. The living polymer complex of claim 1 wherein the Lewis acid is a chloride or a bromide.

3. The method of claim 1 wherein the Lewis acid is selected from the class consisting of BCl$_3$, AlCl$_3$, TiCl$_4$, SbF$_5$, FeCl$_3$, ZnCl$_2$ and VCl$_4$.

4. The method of claim 1 wherein the reaction of the Lewis acid and organic ether occurs in a chlorohydrocarbon.

5. The method of claim 1 wherein sufficient olefin monomer has been added while maintaining the temperature below the decomposition temperature of said complex to increase its molecular weight to within a range of 1,000 to above a hundred thousand.

6. The method of claim 1 wherein the olefin reacts with the complex to give a polymer complex and to consume essentially all said olefin by 30 minutes but still has ability to add more olefin and polymer complex formed molecular weight is proportional to the monomer to initiator ratio.

7. The method of claim 1 wherein the molecular weight increase of said complex is proportional to monomer concentration divided by concentration of said complex.

8. The method of claim 1 wherein sufficient olefin monomers is contacted with said complex to increase its molecular weight to at least 1,000.

9. The method of claim 1 wherein the complex and olefin are fed simultaneously to a reactor and the temperature produced by mixing said complex and olefin would require 10 minutes to decompose half of the said complex fed to the reactor.

10. The method of claim 1 wherein the olefin monomers are isobutylene plus isoprene, said monomers being mixed with an ether complex of boron chloride at a temperature of about $-30°$ C. to decomposition temperature of said complex to give a complex in rubber range.

11. The method of claim 1 wherein the organic ether is a tertiary ether.

12. The method of claim 11 wherein the tertiary ether has a tertiary carbon atom adjacent an ether carbon atom.

13. The method of claim 12 wherein a tertiary carbon atom is adjacent an ether carbon atom containing from 4 to about 12 carbon atoms.

14. The method of claim 1 wherein part of the organic ether forms an end group in the polymer.

* * * * *